(12) United States Patent
Kawano

(10) Patent No.: US 11,391,663 B2
(45) Date of Patent: Jul. 19, 2022

(54) PARTICLE ANALYZING APPARATUS, PARTICLE SEPARATING DEVICE, PARTICLE ANALYSIS METHOD, AND PARTICLE SEPARATING METHOD

(71) Applicant: KAWANO Lab. Inc., Osaka (JP)

(72) Inventor: Makoto Kawano, Ikeda (JP)

(73) Assignee: KAWANO Lab. Inc., Osaka (JP)

( * ) Notice: Subject to any disclaimer, the term of this patent is extended or adjusted under 35 U.S.C. 154(b) by 446 days.

(21) Appl. No.: 16/467,712

(22) PCT Filed: Dec. 8, 2017

(86) PCT No.: PCT/JP2017/044155
§ 371 (c)(1),
(2) Date: Jul. 19, 2019

(87) PCT Pub. No.: WO2018/105721
PCT Pub. Date: Jun. 14, 2018

(65) Prior Publication Data
US 2020/0011781 A1   Jan. 9, 2020

(30) Foreign Application Priority Data
Dec. 8, 2016   (JP) .............................. JP2016-238438

(51) Int. Cl.
*G01N 15/10*   (2006.01)
*G01N 15/02*   (2006.01)

(52) U.S. Cl.
CPC ......... *G01N 15/1031* (2013.01); *G01N 15/02* (2013.01)

(58) Field of Classification Search
CPC .............. G01N 15/1031; G01N 15/02; G01N 15/0227; G01N 2015/0046;
(Continued)

(56) References Cited

U.S. PATENT DOCUMENTS

| 5,147,527 | A | 9/1992 | Hettinger |
| 5,190,635 | A | 3/1993 | Hettinger |

(Continued)

FOREIGN PATENT DOCUMENTS

| JP | H04-503373 A | 6/1992 |
| JP | H06-504581 A | 5/1994 |

(Continued)

OTHER PUBLICATIONS

Davis, R. S. "Equation for the volume magneticsusceptibility of moist air." Metrologia 35.1 (1998): 49. (Year: 1998).*

(Continued)

*Primary Examiner* — Christopher P McAndrew
(74) *Attorney, Agent, or Firm* — Studebaker & Brackett PC

(57) ABSTRACT

A particle analyzing apparatus (10) includes a processor (42) and storage (41). The processor (42) acquires a volume magnetic susceptibility of an analyte particle (p). The storage (41) stores reference data (43). The reference data (43) indicates a volume magnetic susceptibility of a reference particle of the same type as a type of the analyte particle (p) for each of possible crystal forms of the analyte particle (p). The processor (42) determines a crystal form of the analyte particle (p) on the basis of the volume magnetic susceptibility of the analyte particle (p) and the reference data (43).

8 Claims, 10 Drawing Sheets

(58) Field of Classification Search
CPC ... G01N 2015/1075; G01N 2015/0053; G01N 2015/1087; G01N 27/76; B03C 1/0332; B03C 1/288
USPC .......................................................... 324/201
See application file for complete search history.

(56) References Cited

U.S. PATENT DOCUMENTS

| | | | |
|---|---|---|---|
| 5,595,347 | A | 1/1997 | Walpole |
| 5,795,470 | A * | 8/1998 | Wang ...................... B03C 1/035 210/222 |
| 9,366,614 | B2 | 6/2016 | Kawano et al. |
| 10,261,050 | B2 | 4/2019 | Kawano et al. |
| 2010/0108578 | A1 * | 5/2010 | Dittmer .................. B03C 1/288 209/636 |
| 2014/0174157 | A1 | 6/2014 | Kawano et al. |
| 2016/0209366 | A1 | 7/2016 | Kawano et al. |

FOREIGN PATENT DOCUMENTS

| | | |
|---|---|---|
| JP | 2002-001163 A | 1/2002 |
| JP | 2002-086015 A | 3/2002 |
| JP | 2005-214885 A | 8/2005 |
| WO | 2013021910 A1 | 2/2013 |
| WO | 2015030184 A1 | 3/2015 |

OTHER PUBLICATIONS

Blaha, U., et al. "Micro-scale grain-size analysis and magnetic properties of coal-fired power plant fly ash and its relevance for environmental magnetic pollution studies." Atmospheric Environment 42.36 (2008): 8359-8370. (Year: 2008).*
Raghasudha, M., D. Ravinder, and P. Veerasomaiah. "Magnetic properties of Cr-substituted Co-ferrite nanoparticles synthesized by citrate-gel autocombustion method." Journal of nanostructure in Chemistry 3.1 (2013): 1-6. (Year: 2013).*
An Office Action; "Notice of Reasons for Refusal", mailed by the Japanese Patent Office dated Aug. 3, 2021, which corresponds to Japanese Patent Application No. 2020-157446 and is related to U.S. Appl. No. 16/467,712; with English language translation.
International Search Report issued in PCT/JP2017/044155; dated Jan. 23, 2018.
The extended European search report issued by the European Patent Office dated Jan. 12, 2021, which corresponds to European Patent Application No. 17879131.5-1001 and is related to U.S. Appl. No. 16/467,712.

* cited by examiner

PARTICLE ANALYZING APPARATUS, PARTICLE SEPARATING DEVICE, PARTICLE ANALYSIS METHOD, AND PARTICLE SEPARATING METHOD

TECHNICAL FIELD

The present invention relates to particle analyzing apparatuses, particle separating devices, particle analysis methods, and particle separating methods.

BACKGROUND ART

The present inventors have in the past proposed a device and a method for measuring the porosity of a particle using the volume magnetic susceptibility (magnetic susceptibility per unit volume) of the particle (Patent Literature 1). The present inventors have also in the past proposed a device and a method for measuring the surface area of a particle, the average value of the diameters of small holes formed in the particle, the average value of the depths of the small holes, the average value of the volumes of the small holes, and the number of the small holes, using the volume magnetic susceptibility of the particle (Patent Literature 2).

CITATION LIST

Patent Literature

[Patent Literature 1]
    International Publication WO2013/021910
[Patent Literature 2]
    International Publication WO2015/030184

SUMMARY OF INVENTION

Technical Problem

The present inventors have further studied the volume magnetic susceptibility of particles to find that in the case where particles have a plurality of crystal forms, a difference in crystal form influences the volume magnetic susceptibility, and have completed the present invention.

It is an object of a first aspect of the present invention to provide a particle analyzing apparatus and a particle analysis method for determining the crystal form of a particle. In addition, it is an object of a second aspect of the present invention to provide a particle separating device and a particle separating method that can separate particles according to crystal form.

Solution to Problem

A particle analyzing apparatus according to the present invention includes a processor and storage. The processor acquires a volume magnetic susceptibility of an analyte particle. The storage stores reference data. The reference data indicates a volume magnetic susceptibility of a reference particle of the same type as a type of the analyte particle for each of possible crystal forms of the analyte particle. The processor determines a crystal form of the analyte particle on the basis of the volume magnetic susceptibility of the analyte particle and the reference data.

In an embodiment, the reference data indicates a relationship between a particle diameter and the volume magnetic susceptibility of the reference particle for each of the possible crystal forms of the analyte particle.

In an embodiment, the processor acquires a particle diameter and the volume magnetic susceptibility of the analyte particle, and determines the crystal form of the analyte particle on the basis of the particle diameter and the volume magnetic susceptibility of the analyte particle and the reference data.

A particle separating device according to the present invention separates particles according to possible crystal form of the particles. The particle separating device includes a particle trapping section. The particle trapping section generates a gradient of a magnetic flux density, and applies a magnetic force to the particles in a direction opposite to a direction in which a liquid medium containing the particles flows. The particle trapping section traps a particle having a particular crystal form among the particles using the magnetic force.

In an embodiment, there are a plurality of the particle trapping sections in the particle separating device.

In an embodiment, the plurality of particle trapping sections are arranged in a row extending in the direction in which the liquid medium flows.

In an embodiment, the plurality of particle trapping sections generate magnetic fields each having a different value $B(dB/dx)$ of a product of the magnetic flux density and the gradient of the magnetic flux density.

A particle analysis method according to the present invention includes acquiring a volume magnetic susceptibility of an analyte particle, and determining a crystal form of the analyte particle on the basis of the volume magnetic susceptibility of the analyte particle and reference data. The reference data indicates a volume magnetic susceptibility of a reference particle of the same type as a type of the analyte particle for each of possible crystal forms of the analyte particle.

In an embodiment, the particle analysis method further includes acquiring a particle diameter of the analyte particle.

In an embodiment, the reference data indicates a relationship between a particle diameter and the volume magnetic susceptibility of the reference particle for each of the possible crystal forms of the analyte particle.

In an embodiment, in the determining the crystal form of the analyte particle, the crystal form of the analyte particle is determined on the basis of the particle diameter and the volume magnetic susceptibility of the analyte particle and the reference data.

A particle separating method according to the present invention separates particles according to possible crystal form of the particles. The particle separating method includes applying a magnetic force to the particles in a direction opposite to a direction in which a liquid medium containing the particles flows, using a gradient of a magnetic flux density. In the applying a magnetic force to the particles, a particle having a particular crystal form is trapped among the particles using the magnetic force.

In an embodiment, the particle separating method further includes preparing the liquid medium having a volume magnetic susceptibility that allows the particle having the particular crystal form to be trapped.

Advantageous Effects of Invention

With the particle analyzing apparatus and the particle analysis method according to the present invention, the crystal form of a particle can be determined. In addition, with the particle separating device and the particle separating method according to the present invention, a particle can be separated according to crystal form.

DESCRIPTION OF EMBODIMENTS

Figure 1:
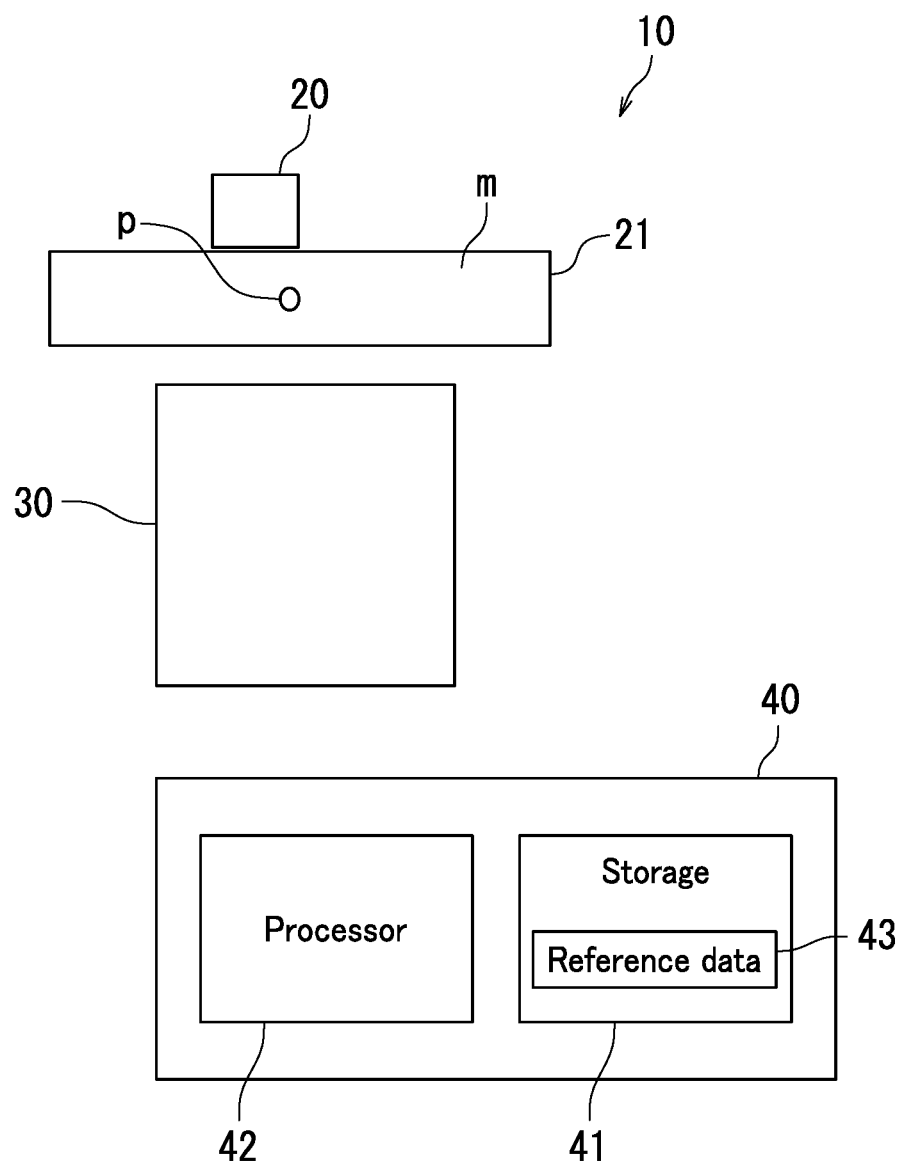
FIG. 1 is a schematic diagram of a particle analyzing apparatus according to a first embodiment of the present invention.

Embodiments of the present invention will now be described with reference to the accompanying drawings. Note that the present invention is in no way limited to the embodiments below. In the drawings, the same or corresponding parts are indicated by the same reference characters and will not be redundantly described.

First Embodiment

FIG. 1 is a schematic diagram of a particle analyzing apparatus 10 of this embodiment. The particle analyzing apparatus 10 determines the crystal form of a particle p. Specifically, the particle analyzing apparatus 10 includes a magnetic field generating section 20, a detection section 30, and a calculation section 40. A cell 21 is disposed near the magnetic field generating section 20.

The magnetic field generating section 20 subjects the particle p in the cell 21 to magnetophoresis. The particle p exhibits crystallinity. A particle exhibiting crystallinity is also hereinafter referred to as a "crystal particle." The detection section 30 detects the particle p in the cell 21. The calculation section 40 acquires the particle diameter and the magnetophoretic velocity of the particle p, from a result of the detection by the detection section 30. The calculation section 40 also measures the volume magnetic susceptibility of the particle p on the basis of the particle diameter and the magnetophoretic velocity of the particle p. Thereafter, the calculation section 40 determines the crystal form of the particle p on the basis of the particle diameter and the volume magnetic susceptibility of the particle p. The particle analyzing apparatus 10 will now be described in greater detail.

The magnetic field generating section 20 generates a magnetic field gradient (a gradient of a magnetic flux density) to apply a magnetic force to the particle p in the cell 21. As a result, the particle p is subjected to magnetophoresis. In this embodiment, the magnetic field generating section 20 includes a pair of permanent magnets that generates a magnetic field gradient. The two permanent magnets in the permanent magnet pair are spaced apart from each other by a predetermined distance of, for example, not less than 100 μm and not more than 500 μm. The cell 21 is disposed in the space between the two permanent magnets.

In this embodiment, the cell 21 is a capillary tube. The capillary tube is an example tubular member. The material for the cell 21 is not particularly limited if the material can transmit visible light or laser light. For example, the cell 21 may be made of glass or plastic.

The particle p is present in a medium m. A single particle p may be present in the medium m, or a plurality of particles p may be present in the medium m. In the case where a plurality of particles p are present in the medium m, the plurality of particles p may be dispersed in the medium m or may be non-uniformly distributed in the medium m. The medium m may be liquid or gas. The medium m may, for example, be selected from water, methanol, ethanol, 1-propanol, acetonitrile, and acetone. Alternatively, the medium m may, for example, be a mixture of two or more of water, methanol, ethanol, 1-propanol, acetonitrile, and acetone. Alternatively, the medium m may, for example, be air.

The particle p is introduced together with the medium m into the cell 21 using, for example, a microsyringe or a micropump. Alternatively, the particle p may be introduced together with the medium m into the cell 21 using the siphon principle. Alternatively, a droplet (solution) containing the particle p may be introduced into the cell 21 (capillary tube) through capillary action. When a droplet containing the particle p is dropped onto an end of the capillary tube, the droplet flows in the capillary tube through capillary action.

Particles p that are analyzed (also referred to as "analyte particles p") have different crystal forms (a plurality of crystal forms). For example, particles p may exhibit different crystal structures as different crystal forms. Particles p may also exhibit anhydride crystal and hydrate crystal as different crystal forms. Particles p may also exhibit different organic solvate crystals in which organic solvent molecules are bonded together as different crystal forms.

Examples of the particle p can include copper phthalocyanine and theophylline. Copper phthalocyanine is known as a component of blue pigments. Theophylline is known as a component of medicines used in treatment of respiratory system diseases such as bronchial asthma, chronic bronchitis, and chronic obstructive pulmonary disease. Copper phthalocyanine exhibits different crystal structures as different crystal forms. Specifically, the crystal forms of copper phthalocyanine include α crystal and β crystal. Theophylline includes anhydride crystal and hydrate crystal as different crystal forms.

Figure 2:
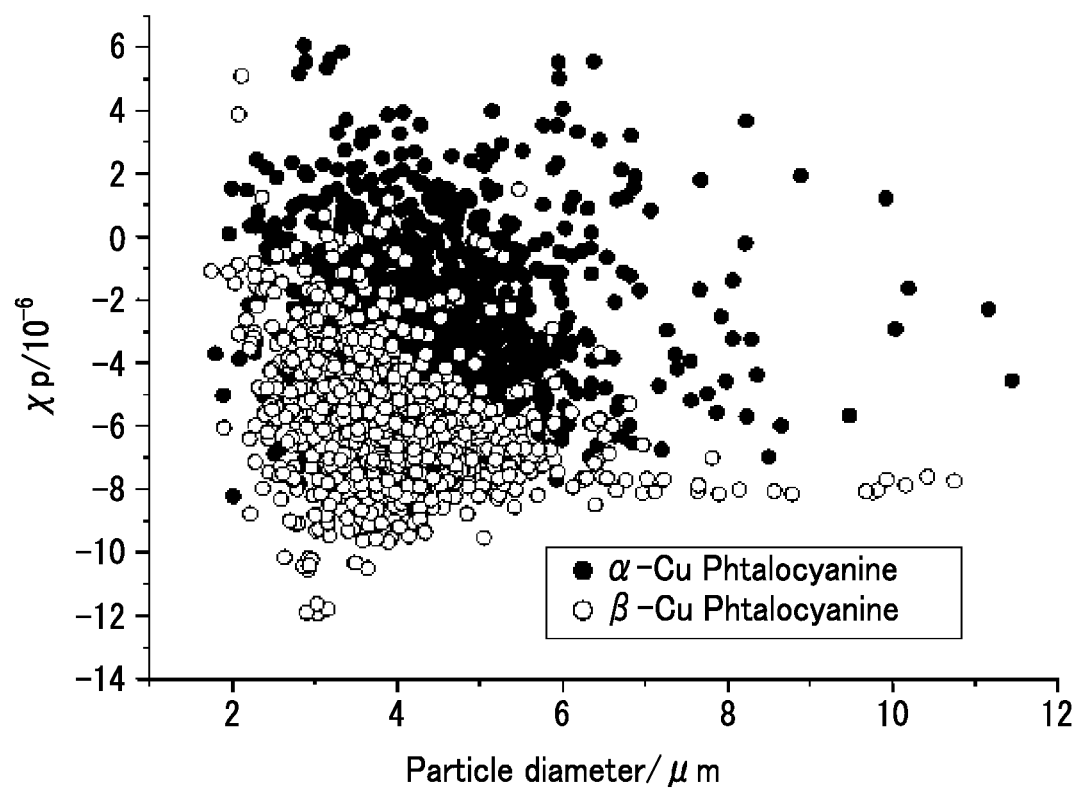
FIG. 2 is a diagram showing a result of measurement of the volume magnetic susceptibility of copper phthalocyanine.
Figure 3:
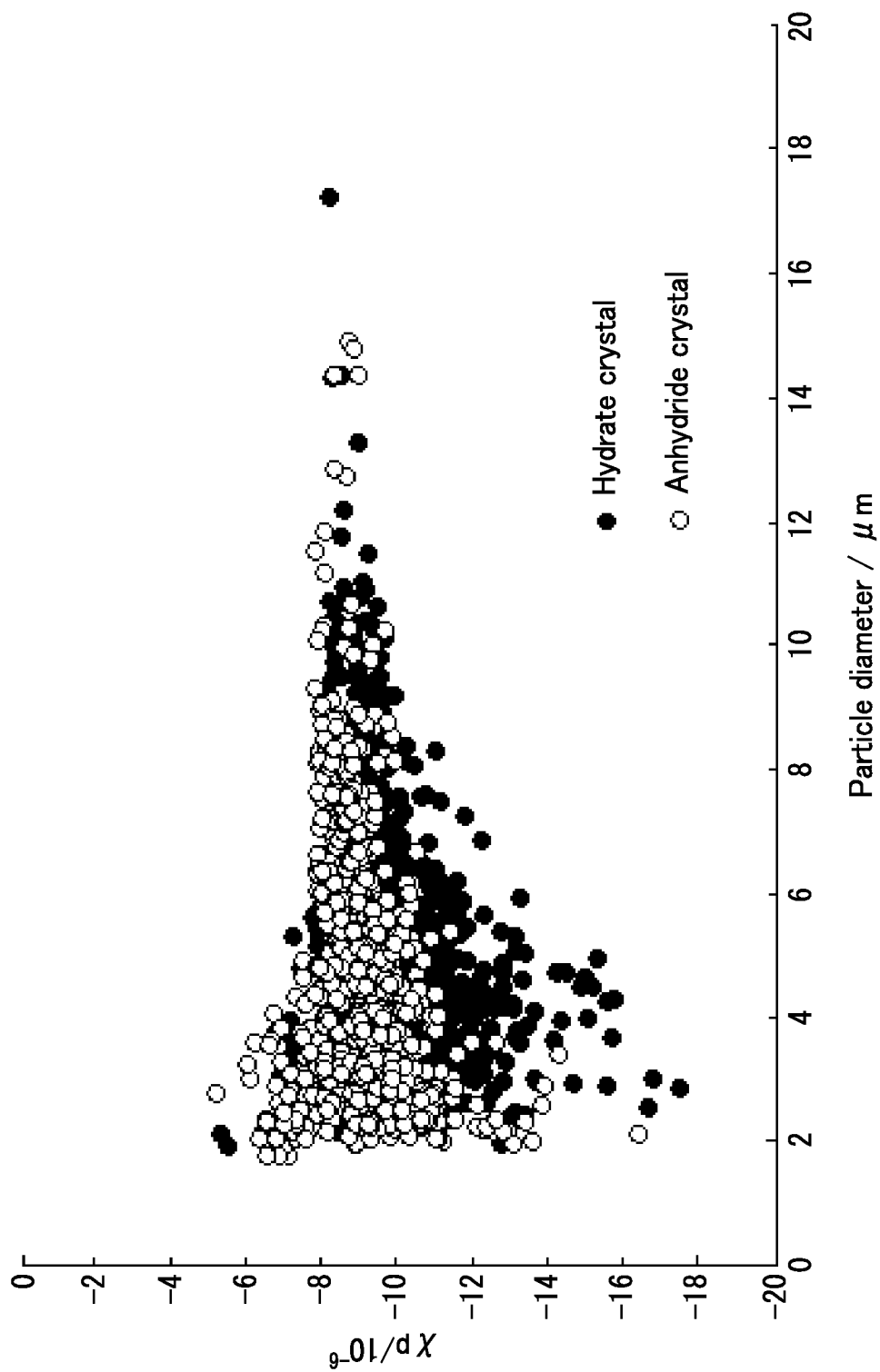
FIG. 3 is a diagram showing a result of measurement of the volume magnetic susceptibility of theophylline.

A relationship (volume magnetic susceptibility distribution) between the particle diameter and the volume magnetic susceptibility of the particle p varies depending on the crystal form. For example, the α crystal and the β crystal of copper phthalocyanine have different relationships (volume magnetic susceptibility distributions) between the particle diameter and the volume magnetic susceptibility (see FIG. 2). In the case where the analyte particle p is copper phthalocyanine, the particle analyzing apparatus 10 determines whether the crystal form of the particle p (copper phthalocyanine) is the α crystal or the β crystal. Similarly, the hydrate crystal and the anhydride crystal of theophylline have different relationships (volume magnetic susceptibility distributions) between the particle diameter and the volume magnetic susceptibility (see FIG. 3). In the case where the analyte particle p is theophylline, the particle analyzing apparatus 10 determines whether the crystal form of the particle p (theophylline) is the hydrate crystal or the anhydride crystal.

The detection section 30 detects the particle p in the cell 21, and generates a signal indicating a position and the particle diameter of the particle p in the cell 21. The calculation section 40 measures the particle diameter and the magnetophoretic velocity of the particle p on the basis of the signal generated by the detection section 30. The calculation section 40 includes storage 41 and a processor 42.

The storage 41 stores a program and setting information, etc. The storage 41 may include, for example, a hard disk drive (HDD), random access memory (RAM), and read only memory (ROM). The processor 42 executes the computer program stored in the storage 41 to perform various processes such as numerical calculation, information processing, and device control. The processor 42 may include, for example, a processor, such as a central processing unit (CPU) or a microprocessing unit (MPU). As the calculation section 40, for example, a general-purpose computer, such as a personal computer, is used.

The processor 42 acquires changes over time of the position of the particle p from the signal generated by the detection section 30. For example, the detection section 30 detects the particle p in the cell 21 at predetermined time intervals. This allows measurement of the position of the particle p at different times. The processor 42 measures the magnetophoretic velocity of the particle p on the basis of changes over time of the position of the particle p.

The processor 42 also measures the particle diameter of the particle p on the basis of the signal generated by the detection section 30. The processor 42 measures the volume magnetic susceptibility of the particle p on the basis of the particle diameter and the magnetophoretic velocity of the particle p.

For example, the processor 42 calculates the volume magnetic susceptibility of the particle p on the basis of Expression (1) below.

$$v = \{2(\chi s - \chi m)r^2/9\eta\mu_o\}B(dB/dx) \quad (1)$$

In Expression (1), v represents the magnetophoretic velocity of the particle p, $\chi s$ represents the volume magnetic susceptibility of the particle p, $\chi m$ represents the volume magnetic susceptibility of the medium m, r represents the radius of the particle p, η represents the coefficient of viscosity of the medium m, $\mu_o$ represents the magnetic permeability of vacuum, B represents a magnetic flux density, and dB/dx represents a magnetic field gradient (the gradient of the magnetic flux density). Note that Expression (1) is derived from the fact that the difference between the magnetic forces applied to the particle p and the medium m in an axial direction of the cell 21 (capillary tube) is substantially equal to viscous drag.

The storage 41 stores reference data 43. The reference data 43 indicates the relationship between the particle diameter and the volume magnetic susceptibility of a reference particle that is of the same type as that of the analyte particle p, for each of possible crystal forms of the analyte particle p (reference particle). The processor 42 determines the crystal form of the analyte particle p, on the basis of the particle diameter and the volume magnetic susceptibility of the analyte particle p, and the reference data 43. For example, in the case where the analyte particle p is copper phthalocyanine, the reference data 43 indicates a relationship between the particle diameter and the volume magnetic susceptibility of the α crystal, and a relationship between the particle diameter and the volume magnetic susceptibility of the β crystal. Similarly, in the case where the analyte particle p is theophylline, the reference data 43 indicates a relationship between the particle diameter and the volume magnetic susceptibility of the hydrate crystal, and a relationship between the particle diameter and the volume magnetic susceptibility of the anhydride crystal.

Figure 4A:
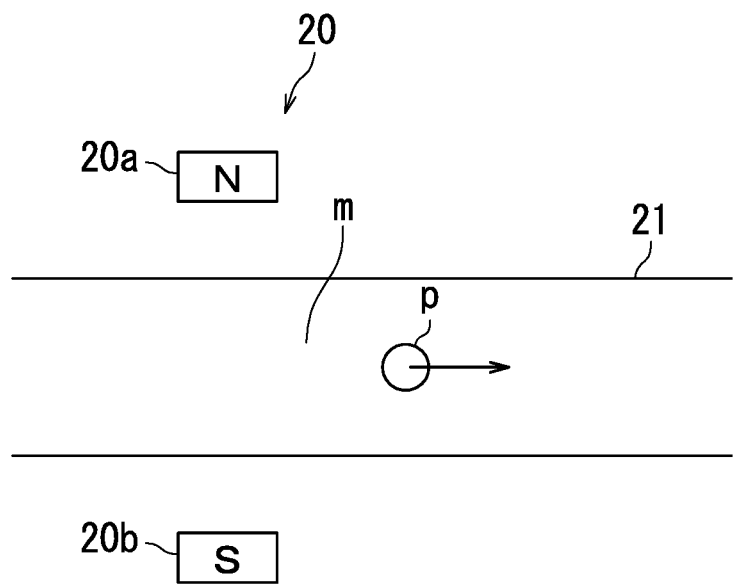
FIGS. 4A and 4B are diagrams showing motion of a particle according to the first embodiment of the present invention.
Figure 4B:
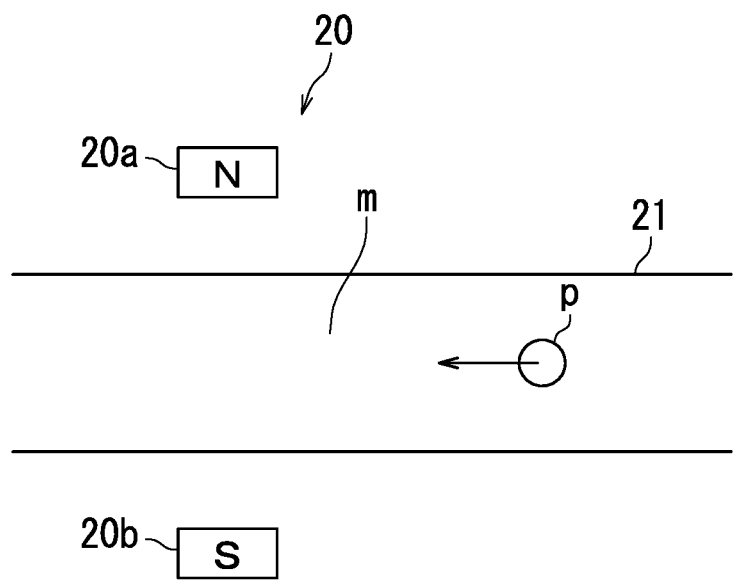

Next, motion of the particle p will be described with reference to FIGS. 4A and 4B. FIGS. 4A and 4B are diagrams showing the motion of the particle p. Specifically, FIGS. 4A and 4B show a relationship between the volume magnetic susceptibilities of the particle p and the medium m and the direction of movement of the particle p. As shown in FIGS. 4A and 4B, the magnetic field generating section 20 includes a permanent magnet 20a whose magnetic pole is the north pole, and a permanent magnet 20b whose magnetic pole is the south pole. The two permanent magnets 20a and 20b face each other with the cell 21 interposed therebetween.

As shown in FIG. 4A, in the case where the volume magnetic susceptibility of the particle p is smaller than the volume magnetic susceptibility of the medium m, the particle p moves in a direction away from the magnetic field (the magnetic field generating section 20). Meanwhile, as shown in FIG. 4B, in the case where the volume magnetic susceptibility of the particle p is greater than the volume magnetic susceptibility of the medium m, the particle p moves toward the magnetic field (the magnetic field generating section 20).

As shown in FIGS. 4A and 4B, the motion of the particle p is determined on the basis of the volume magnetic susceptibilities of the particle p and the medium m. Note that the particle p receives a force near ends of the permanent magnets 20a and 20b. For example, the particle p receives a force in a range of about ±200 μm near the ends of the permanent magnets 20a and 20b.

Figure 5:
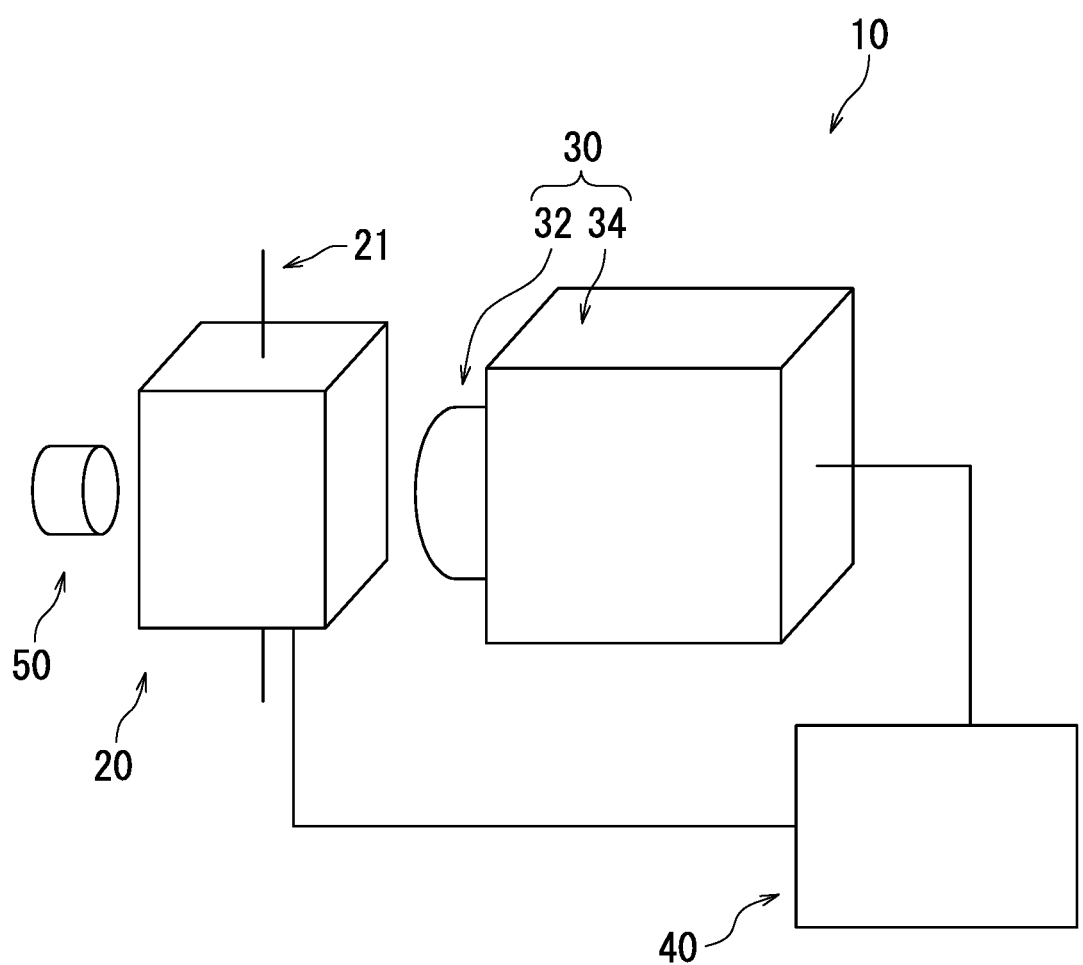
FIG. 5 is a diagram showing a configuration of the particle analyzing apparatus of the first embodiment of the present invention.

Next, the particle analyzing apparatus 10 will be further described with reference to FIG. 5. FIG. 5 is a diagram showing a configuration of the particle analyzing apparatus 10. As shown in FIG. 5, the particle analyzing apparatus 10 further includes a light source 50. In addition, the detection section 30 includes a magnification section 32 and an imaging section 34.

The light source 50 emits relatively high-intensity light that contains a visible light component. The light source 50 irradiates the cell 21 with the light. As a result, the particle p is irradiated with the light. The light emitted by the light source 50 may have a relatively broad wavelength spectrum. As the light source 50, for example, a halogen lamp may be preferably used.

An image of the particle p introduced into the cell 21 is magnified by a suitable factor by the magnification section 32 and is captured by the imaging section 34. The position of the particle p can be specified from a result of the image capture by the imaging section 34 (an image captured by the imaging section 34). For example, the magnification section 32 includes an objective lens, and the imaging section 34 includes a charge-coupled device (CCD). Alternatively, each pixel of the imaging section 34 may include a photodiode or a photomultiplier tube. For example, the imaging section 34 captures an image of the particle p at predetermined time intervals. Note that the imaging section 34 may capture light that has been emitted from the light source 50 and transmitted through the cell 21, or light that has been emitted from the light source 50 and scattered by the particle p.

The calculation section 40 (the processor 42) acquires changes over time of the position of the particle p from the result of image capture by the imaging section 34, and measures the magnetophoretic velocity of the particle p on the basis of the changes over time of the position of the particle p.

The calculation section 40 (the processor 42) also measures the particle diameter of the particle p on the basis of the result of the image capture of the particle p. For example, the calculation section 40 (the processor 42) executes the following process. Specifically, initially, an image captured by the imaging section 34 is converted into a monochromatic image, and the luminance thereof is converted into numerical values. Next, the derivative values of the luminance values are compared with a threshold value to set the boundary of the particle p. Next, the area of the particle p is detected from the boundary thus set, and the particle diameter is calculated from the radius of a circle corresponding to the area. Alternatively, the center of the particle p is defined, a plurality of straight lines passing through the center of the particle p are drawn, a distance between two points where each straight line intersects with the boundary of the particle p is obtained, and an average of the thus obtained distances is calculated.

Figure 6:
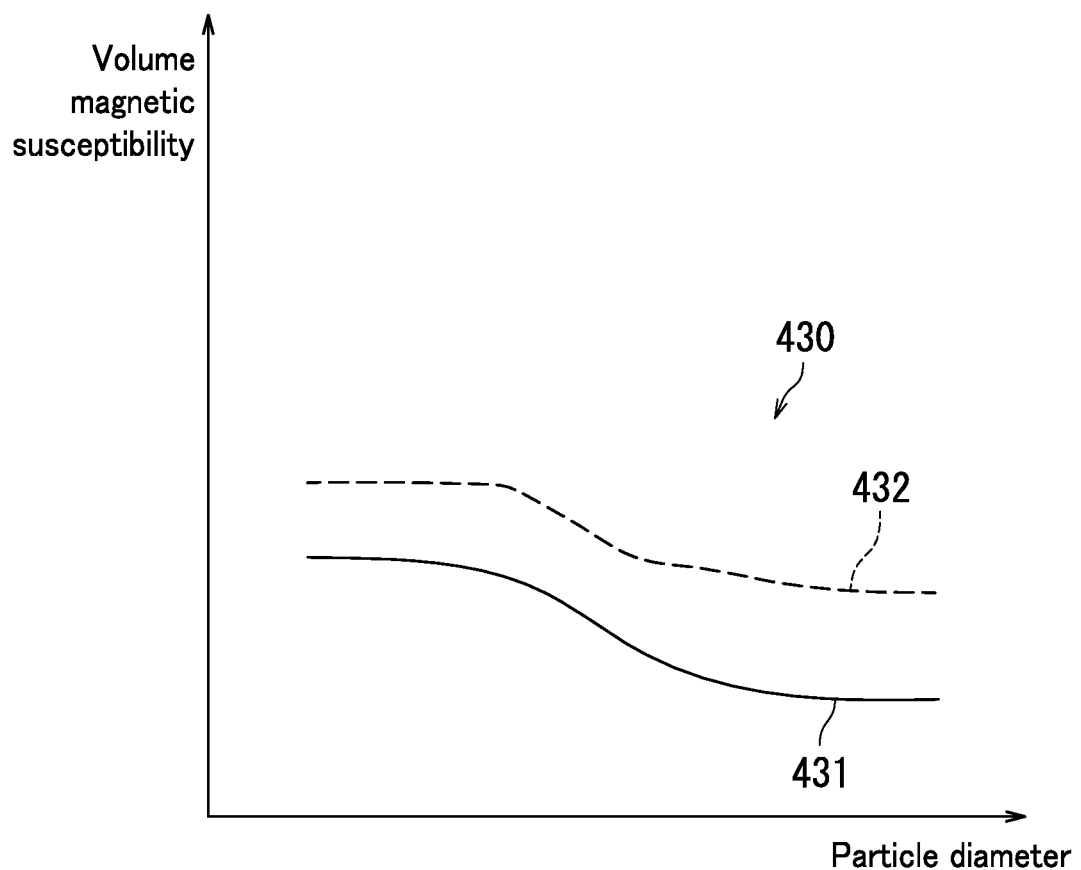
FIG. 6 is a diagram showing an example of reference data according to the first embodiment of the present invention.

Next, the reference data 43 will be described with reference to FIG. 6. FIG. 6 is a diagram showing an example of the reference data 43. Specifically, FIG. 6 shows a relationship between the particle diameter and the volume magnetic susceptibility of a reference particle.

In FIG. 6, the horizontal axis represents the particle diameter, and the vertical axis represents the volume magnetic susceptibility. In addition, in FIG. 6, a graph 430 shows the relationship between the particle diameter and the volume magnetic susceptibility of a reference particle for each of possible crystal forms of the reference particle. The storage 41, which has been described with reference to FIG. 1, stores the reference data 43 corresponding to the graph 430. Specifically, the storage 41 stores, as the reference data 43, data indicating an expression of the graph 430. Alternatively, the storage 41 stores, as the reference data 43, data indicating a table corresponding to the graph 430.

For example, in the case where the analyte particle p (reference particle) can have two crystal forms, as shown in FIG. 6 the graph 430 includes a first graph 431 and a second graph 432. The first graph 431 corresponds to a first crystal form indicating one of the two crystal forms, and the second graph 432 corresponds to a second crystal form indicating the other of the two crystal forms. In this case, the reference data 43 contains first reference data corresponding to the first graph 431, and second reference data corresponding to the second graph 432.

The processor 42, which has been described with reference to FIG. 1, when acquiring the particle diameter and the volume magnetic susceptibility of the analyte particle p, determines whether the crystal form of the analyte particle p is the first crystal form or the second crystal form, by referring to the first reference data and the second reference data.

Specifically, the processor 42 acquires the volume magnetic susceptibility of a reference particle that has the same particle diameter as that of the analyte particle p, from each of the first reference data and the second reference data. The volume magnetic susceptibility of a reference particle that has the same particle diameter as that of the analyte particle p is also hereinafter referred to as a "reference volume magnetic susceptibility." The processor 42 determines which of the acquired reference volume magnetic susceptibilities is closest to the volume magnetic susceptibility of the analyte particle p. Based on a result of the determination, the processor 42 determines the crystal form of the analyte particle p.

Note that the reference data 43 may indicate a volume magnetic susceptibility range for each particle diameter. In that case, the processor 42 acquires, from the reference data 43, the volume magnetic susceptibility range of a reference particle that has the same particle diameter as that of the analyte particle p, for each crystal form. The volume magnetic susceptibility range of a reference particle that has the same particle diameter as that of the analyte particle p is also hereinafter referred to as a "reference volume magnetic susceptibility range." The processor 42 determines which of the acquired reference volume magnetic susceptibility ranges includes the value of the volume magnetic susceptibility of the analyte particle p.

Alternatively, the reference data 43 may indicate a volume magnetic susceptibility range and a median of the volume magnetic susceptibility range for each particle diameter. In that case, the processor 42 acquires, from the reference data 43, the volume magnetic susceptibility range (reference volume magnetic susceptibility range) and the median for a reference particle that has the same particle diameter as that of the analyte particle p, for each crystal form. The processor 42 determines which of the acquired reference volume magnetic susceptibility ranges includes the value of the volume magnetic susceptibility of the analyte particle p. When there are a plurality of reference volume magnetic susceptibility ranges including the value of the volume magnetic susceptibility of the analyte particle p, the processor 42 determines which of the acquired medians is closest to the volume magnetic susceptibility of the analyte particle p. Note that the reference data 43 may indicate an average value instead of the median.

Figure 7:
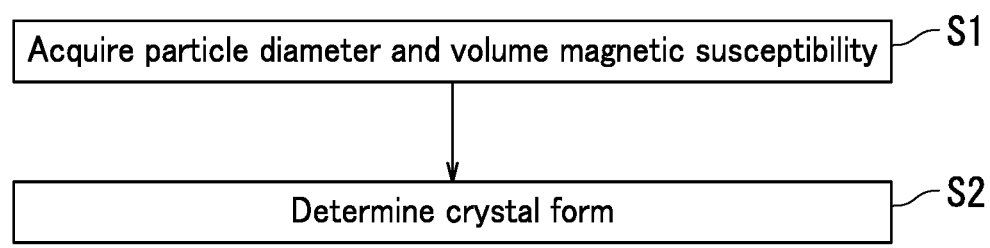
FIG. 7 is a flowchart showing a particle analysis method according to the first embodiment of the present invention.

Next, a particle analysis method of this embodiment will be described with reference to FIG. 7. FIG. 7 is a flowchart showing the particle analysis method of this embodiment. The particle analysis method of this embodiment may be executed using the particle analyzing apparatus 10 that has been described with reference to FIGS. 1-6.

As shown in FIG. 7, initially, the particle diameter and the volume magnetic susceptibility of the analyte particle p are acquired (step S1). Next, the crystal form of the analyte particle p is determined on the basis of the particle diameter and the volume magnetic susceptibility of the analyte particle p, and the reference data 43 (step S2).

In order to acquire the particle diameter and the volume magnetic susceptibility of the analyte particle p, the magnetic field generating section 20 subjects the particle p in the cell 21 to magnetophoresis, and the detection section 30 detects the particle p in magnetophoresis. Thereafter, the processor 42 measures the particle diameter and the volume magnetic susceptibility of the particle p on the basis of a result of the detection by the detection section 30.

In order to determine the crystal form of the analyte particle p, the processor 42 determines the crystal form of the particle p on the basis of the particle diameter and the volume magnetic susceptibility of the analyte particle p, and the reference data 43 stored in the storage 41.

In the foregoing, the first embodiment has been described. According to the first embodiment, the crystal form of the analyte particle p can be determined.

Although in this embodiment, the magnetic field generating section 20 includes the pair of permanent magnets 20a and 20b, the magnetic field generating section 20 may include a pair of magnetic pole pieces for generating a magnetic field gradient. Alternatively, the magnetic field generating section 20 may include an electromagnet, a magnetic circuit, or a superconducting magnet for generating a magnetic field gradient. In the case where the magnetic field generating section 20 includes a pair of magnetic pole pieces, the two magnetic pole pieces included in the magnetic pole piece pair are spaced apart from each other by a predetermined distance of, for example, not less than 100 µm and not more than 500 µm. The cell 21 is disposed in the space between the two magnetic pole pieces. The magnetic pole pieces may, for example, be magnetized iron pieces. The iron pieces may, for example, be magnetized by a permanent magnet, an electromagnet, a magnetic circuit, or a superconducting magnet.

In addition, although in this embodiment, the cell 21 is a capillary tube, the cell 21 may be a glass cell or a plastic cell. The glass cell and the plastic cell have a recessed portion for holding the particle p or the medium m containing the particle p. Alternatively, the glass cell and the plastic cell have a flow channel in which the medium m containing the particle p flows. In the case where the cell 21 is a glass cell or a plastic cell having a micro-flow channel, when a droplet (solution) containing the particle p is dropped onto an end of the micro-flow channel, the droplet flows in the micro-flow channel through capillary action.

In addition, although in this embodiment, the particle analyzing apparatus 10 includes the light source 50, the particle analyzing apparatus 10 may include a laser instead of the light source 50, or may further include a laser in addition to the light source 50. In the case where the particle analyzing apparatus 10 includes the light source 50 and a laser, when the light source 50 emits light, the emission of laser light from the laser is stopped, and when the laser emits laser light, the emission of light from the light source 50 is stopped. In the case where a laser is used, the particle p introduced into the cell 21 is irradiated with laser light. The imaging section 34 captures laser light (scattered light) scattered by the particle p through the magnification section 32.

In the case where the particle p is irradiated with laser light, the capillary tube is preferably a square-shaped capillary that has a square cross-section perpendicular to its axial direction. The use of such a square-shaped capillary facilitates specular surface finishing of one of the side surfaces of the cell 21 that is irradiated with laser light.

In addition, although in this embodiment, the particle diameter of the particle p is acquired by image analysis, the particle diameter of the particle p may be measured by analyzing the Brownian motion of the particle p. Specifically, a diffusion coefficient is calculated from the variance of changes (displacements) of the position of the particle p in a direction perpendicular to the axial direction of the capillary tube, and the particle diameter of the particle p can be calculated from the diffusion coefficient. Alternatively, the particle diameter of the particle p may be acquired using a laser on the basis of, for example, dynamic light scattering or static light scattering.

In addition, although in this embodiment, the calculation section 40 (the processor 42) measures the particle diameter of the particle p, an image captured by the imaging section 34 may be displayed on a display, and an analyst may measure the particle diameter of the particle p in the image displayed on the display. Alternatively, an image captured by the imaging section 34 may be printed, and an analyst may measure the particle diameter of the particle p in the printed image.

In addition, although in this embodiment, the imaging section 34 captures an image of the particle p at predetermined time intervals to acquire the magnetophoretic velocity of the particle p, the magnetophoretic velocity of the particle p may be measured using a laser on the basis of, for example, laser Doppler velocimetry.

In addition, although in this embodiment, the volume magnetic susceptibility of the particle p is acquired on the basis of the measured value of the magnetophoretic velocity, the volume magnetic susceptibility of the particle p may be acquired using a SQUID device, magnetic balance, or the like. In that case, the particle p does not need to be subjected to magnetophoresis. Therefore, the magnetic field generating section 20 may not be used.

In addition, although in this embodiment, the reference data 43 indicates the relationship between the particle diameter and the volume magnetic susceptibility of a reference particle for each crystal form, the reference data 43 may indicate the volume magnetic susceptibility of a reference particle for each crystal form. Alternatively, the reference data 43 may indicate the volume magnetic susceptibility range of a reference particle for each crystal form, or may indicate the volume magnetic susceptibility range and a volume magnetic susceptibility median or average of a reference particle for each crystal form. In that case, the calculation section 40 determines the crystal form of the analyte particle p on the basis of the volume magnetic susceptibility of the analyte particle p. In other words, the calculation section 40 determines the crystal form of the analyte particle p without referring to the particle diameter of the analyte particle p.

In order to determine the crystal form without referring to the particle diameter of the analyte particle p, the volume magnetic susceptibility of the analyte particle p may be acquired using a literature value as the particle diameter of the particle p. When a literature value is used as the particle diameter of the particle p, the measurement of the particle diameter may not be performed. Alternatively, the volume magnetic susceptibility of the particle p may be acquired using a SQUID device, magnetic balance, or the like. In that case, the magnetophoretic velocity may not be acquired.

Second Embodiment

Figure 8:
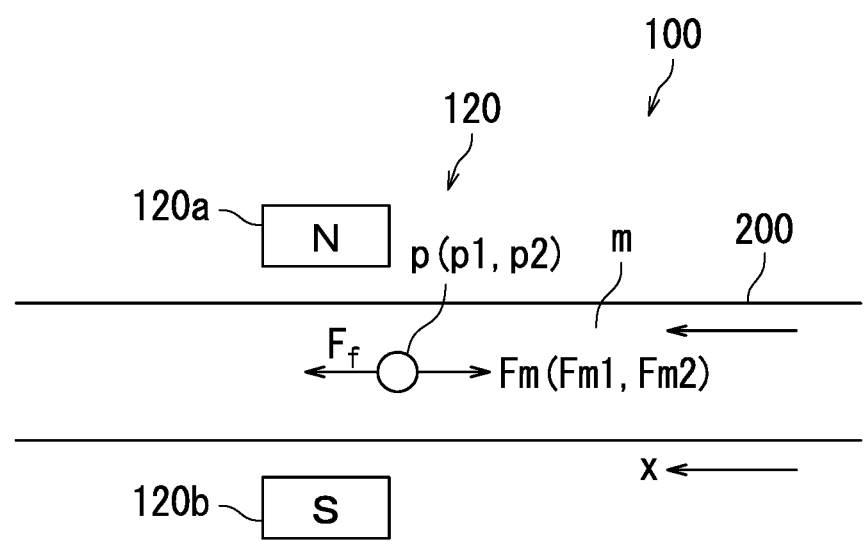
FIG. 8 is a diagram showing a configuration of a particle separating device according to a second embodiment of the present invention.

A second embodiment of the present invention will now be described with reference to FIGS. 8-10. FIG. 8 is a diagram showing a configuration of a particle separating device 100 of this embodiment. The particle separating device 100 separates particles p (crystal particles) according to possible crystal form of the particles p.

As shown in FIG. 8, the particle separating device 100 includes a particle trapping section 120. A cell 200 is disposed near the particle trapping section 120. The cell 200 is a tubular member, such as a capillary tube. The material for the cell 200 is not particularly limited. For example, the cell 200 may be made of, for example, glass or plastic.

The particle trapping section 120 generates a magnetic field gradient (a gradient of a magnetic flux density) to apply a magnetic force to the particles p in the cell 200. In this embodiment, the particle trapping section 120 includes a pair of permanent magnets 120a and 120b that generates a magnetic field gradient. The two permanent magnets 120*a* and 120*b* are spaced apart from each other by a predetermined distance of, for example, not less than 100 μm and not more than 500 μm. The cell 200 is disposed in the space between the two permanent magnets 120*a* and 120*b*.

In this embodiment, a medium m flowing in the cell 200 is liquid. In other words, the medium m is a solvent. The medium m is hereinafter referred to as a "solvent m." A single particle p may be present in the solvent m, or a plurality of particles p may be present in the solvent m. In the case where a plurality of particles p are present in the solvent m, the plurality of particles p may be dispersed in the solvent m or may be non-uniformly distributed in the solvent m.

In this embodiment, the particles p have two crystal forms. Therefore, as described in the first embodiment, the particles p have different volume magnetic susceptibilities for the different crystal forms. One of the two crystal forms is also hereinafter referred to as a "first crystal form," and the other of the two crystal forms is also hereinafter referred to as a "second crystal form." A particle p having the first crystal form is also referred to as a "first particle p1," and a particle p having the second crystal form is also referred to as a "second particle p2." In addition, the volume magnetic susceptibility of the first particle p1 is also referred to as a "first volume magnetic susceptibility $\chi p1$," and the volume magnetic susceptibility of the second particle p2 is also referred to as a "second volume magnetic susceptibility $\chi p2$."

The particles p are introduced together with the solvent m into the cell 200 using a micropump. As a result, the solvent m flows in an axial direction (x-direction) of the cell 200 (tubular member). The particles p receive a fluid driving force $F_f$ from the solvent m, and move to a location near the particle trapping section 120 (the permanent magnets 120*a* and 120*b*).

The particle trapping section 120 applies a magnetic force to the particles p in a direction opposite to the direction in which the solvent m flows. The particle trapping section 120 traps a particle p having a particular crystal form using the magnetic force. In this embodiment, the particle trapping section 120 traps a particle p having the second crystal form (the second particle p2).

Specifically, when each particle p reaches near the permanent magnets 120*a* and 120*b*, the particle p receives a magnetic force generated by the permanent magnets 120*a* and 120*b*. In this embodiment, the volume magnetic susceptibility of the solvent m is greater than the volume magnetic susceptibilities (the first volume magnetic susceptibility $\chi p1$ and the second volume magnetic susceptibility $\chi p2$) of the particles p. Therefore, as described above with reference to FIG. 4A, a magnetic force is applied to the particles p in a direction away from the magnetic field (the particle trapping section 120). In other words, the magnetic force acts in such a direction that the particles p are pushed back against the flow of the solvent m. The condition that the volume magnetic susceptibility of the solvent m is greater than the volume magnetic susceptibilities of the particles p is also hereinafter referred to as a "first trapping condition."

A component Fm in the x-direction of the magnetic force applied to each particle p can be represented by Expression (2) below.

$$Fm = -\{4(\chi p - \chi m)\pi r^3/3\mu_o\}B(dB/dx) \quad (2)$$

In Expression (2), $\chi p$ represents the volume magnetic susceptibility of the particle p, $\chi m$ represents the volume magnetic susceptibility of the solvent m, r represents the radius of the particle p, $\mu_o$ represents the magnetic permeability of vacuum, B represents a magnetic flux density, and dB/dx represents a magnetic field gradient (the gradient of the magnetic flux density).

As indicated in Expression (2), the magnitude of the component Fm in the x-direction of the magnetic force depends on the volume magnetic susceptibility difference ($\chi p - \chi m$) between the particle p and the solvent m. The magnitude of the component Fm in the x-direction of the magnetic force also depends on the value of B(dB/dx), which is the value of the product of the magnetic flux density B and the magnetic field gradient dB/dx. The component Fm in the x-direction of the magnetic force is also hereinafter referred to as a "magnetic force Fm." The magnetic force Fm applied to the first particle p1 is also referred to as a "first magnetic force Fm1," and the magnetic force Fm applied to the second particle p2 is also referred to as a "second magnetic force Fm2."

In this embodiment, the solvent m has a volume magnetic susceptibility that establishes a relationship indicated by Expression (3) below.

$$Fm1 < F_f \leq Fm2 \quad (3)$$

As indicated in Expression (3), the solvent m has a volume magnetic susceptibility that causes the first magnetic force Fm1 to be smaller than the fluid driving force $F_f$, and causes the second magnetic force Fm2 to be greater than or equal to the fluid driving force $F_f$. When the relationship indicated by Expression (3) is established, the particle trapping section 120 can trap the second particle p2. The condition under which the relationship indicated by Expression (3) is established is also referred to as a "second trapping condition."

The second trapping condition can be established by adjusting the volume magnetic susceptibility difference ($\chi p - \chi m$) between the particle p and the solvent m. Therefore, by selecting the solvent m used (the volume magnetic susceptibility of the solvent m), depending on the volume magnetic susceptibilities (the first volume magnetic susceptibility $\chi p1$ and the second volume magnetic susceptibility $\chi p2$) of the particles p, the first trapping condition and the second trapping condition can be established. Alternatively, by adjusting a component of the solvent m (the volume magnetic susceptibility of the solvent m), depending on the volume magnetic susceptibilities (the first volume magnetic susceptibility $\chi p1$ and the second volume magnetic susceptibility $\chi p2$) of the particles p, the first trapping condition and the second trapping condition can be established. The volume magnetic susceptibility of the particle p for each crystal form may be acquired by referring to the reference data 43 described above in the first embodiment.

In order to adjust a component of the solvent m, for example, an aqueous manganese chloride solution may be used as the solvent m. When an aqueous manganese chloride solution is used, the volume magnetic susceptibility of the solvent m (aqueous manganese chloride solution) can be adjusted by adjusting the amount (% by mass) of manganese added.

Figure 9A:
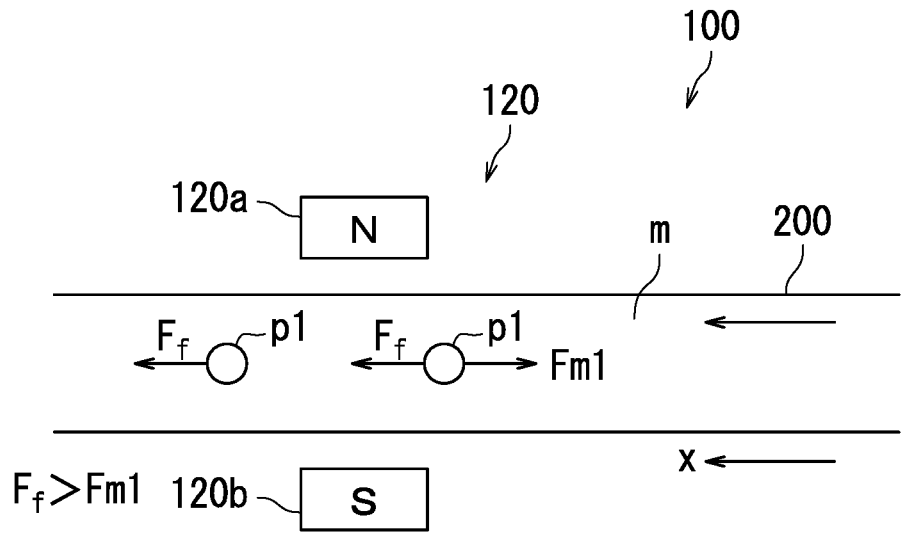
FIG. 9A is a diagram showing motion of a first particle according to the second embodiment of the present invention.

Next, motion of the first particle p1 and the second particle p2 will be described with reference to FIGS. 9A and 9B. FIG. 9A is a diagram showing the motion of the first particle p1, and FIG. 9B is a diagram showing the motion of the second particle p2.

As shown in FIG. 9A, when the first particle p1 reaches at or near a magnetic field formed by the particle trapping section 120 (the permanent magnets 120*a* and 120*b*), the first particle p1 receives the first magnetic force Fm1. The first magnetic force Fm1 acts in such a direction that the first particle p1 is pushed back against the flow of the solvent m. However, as indicated in Expression (3), the first magnetic force Fm1 is smaller than the fluid driving force $F_f$ applied to the first particle p1 by the solvent m. Therefore, the first particle p1 (the particle p having the first crystal form) passes through the magnetic field.

Figure 9B:
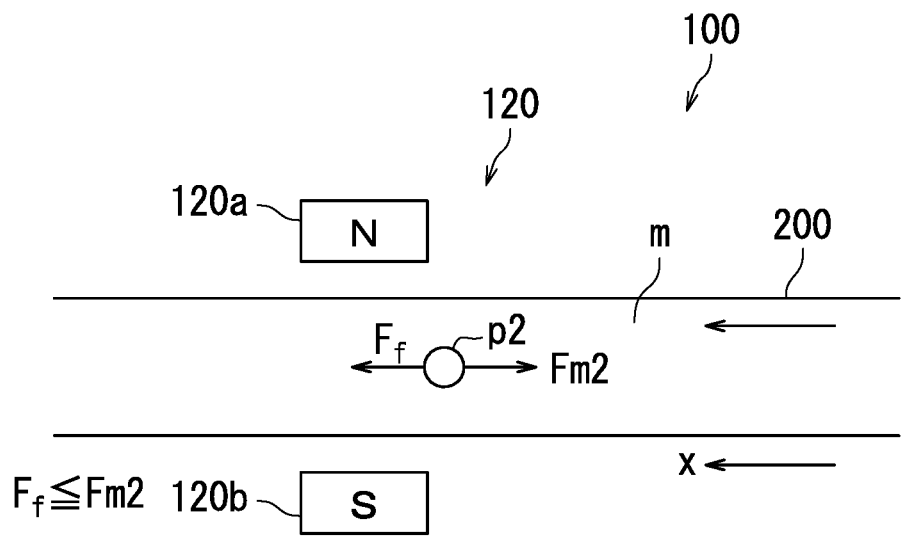
FIG. 9B is a diagram showing motion of a second particle according to the second embodiment of the present invention.

As shown in FIG. 9B, when the second particle p2 reaches at or near the magnetic field formed by the particle trapping section 120 (the permanent magnets 120a and 120b), the second particle p2 receives the second magnetic force Fm2. The second magnetic force Fm2 acts in such a direction that the second particle p2 is pushed back against the flow of the solvent m. As indicated in Expression (3), the second magnetic force Fm2 is greater than or equal to the fluid driving force $F_f$ applied to the second particle p2 by the solvent m. Therefore, the movement of the second particle p2 is blocked by the second magnetic force Fm2. As a result, the second particle p2 (the particle p having the second crystal form) is trapped by the magnetic field.

Next, a particle separating method of this embodiment will be described with reference to FIG. 10. FIG. 10 is a flowchart showing the particle separating method of this embodiment. The particle separating method of this embodiment may be executed using the particle separating device 100 that has been described with reference to FIGS. 8, 9A, and 9B.

Figure 10:
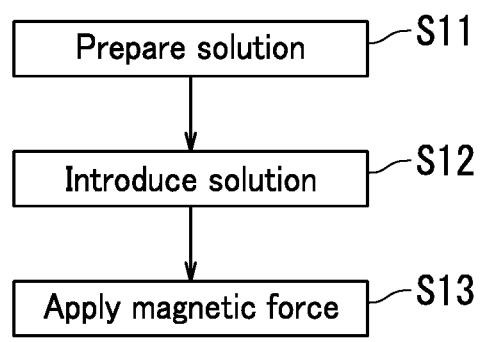
FIG. 10 is a flowchart showing a particle separating method according to the second embodiment of the present invention.

As shown in FIG. 10, initially, a solution is prepared (step S11). The solution contains the particles p and the solvent m. In this embodiment, a solution (the solvent m) that establishes the first trapping condition and the second trapping condition is prepared. Specifically, the solvent m that has a volume magnetic susceptibility that allows the particle p having the second crystal form to be trapped by the particle trapping section 120 is prepared, and the particles p are added to the prepared solvent m.

Next, the solution is introduced into the cell 200 (step S12). Specifically, the solution is caused to flow into the cell 200 (tubular member) from an end thereof using a micropump. As a result, the solvent m flows in the axial direction of the cell 200, and each particle p receives the fluid driving force $F_f$ from the solvent m, and moves to a location at or near the particle trapping section 120 (the permanent magnets 120a and 120b).

When each particle p moves to a location at or near the particle trapping section 120, the magnetic force Fm is applied to the particle p due to the magnetic field gradient in a direction opposite to the direction in which the solvent m flows (step S13). As described above with reference to FIG. 9A, in the case where the crystal form of the particle p is the first crystal form, the particle p receives the fluid driving force $F_f$, which is greater than the magnetic force Fm (the first magnetic force Fm1), and passes through the magnetic field formed by the particle trapping section 120. Meanwhile, as described above with reference to FIG. 9B, in the case where the crystal form of the particle p is the second crystal form, the particle p receives the magnetic force Fm (the second magnetic force Fm2) that is greater than the fluid driving force $F_f$, and is trapped by the magnetic field formed by the particle trapping section 120.

In the foregoing, the second embodiment has been described. According to this embodiment, the particles p can be separated according to crystal form.

Although in this embodiment, the cell 200 is a tubular member, the cell 200 is not limited to a tubular member. For example, the cell 200 may be a glass cell or a plastic cell in which a flow channel in which a solvent (solution) containing the particles p flows is formed.

In addition, although in this embodiment, a solution (a solvent containing the particles p) is introduced into the cell 200 using a micropump, the solution may be introduced into the cell 200 through the siphon principle or capillary action.

In addition, although in this embodiment, the relationship (the second trapping condition) indicated by Expression (3) is established by adjusting the volume magnetic susceptibility difference ($\chi p - \chi m$) between the particle p and the solvent m, that is, adjusting the volume magnetic susceptibility of the solvent m, the relationship indicated by Expression (3) may be established by adjusting the value of B(dB/dx). For example, the value of B(dB/dx) can be adjusted by selecting the permanent magnets 120a and 120b used. Alternatively, the value of B(dB/dx) can be adjusted by adjusting the distance between the two permanent magnets 120a and 120b.

In addition, although in this embodiment, the particle trapping section 120 includes the pair of permanent magnets 120a and 120b, the particle trapping section 120 may include a pair of magnetic pole pieces for generating a magnetic field gradient (a gradient of a magnetic flux density). Alternatively, the particle trapping section 120 may include an electromagnet, a magnetic circuit, or a superconducting magnet for generating a magnetic field gradient. In the case where the particle trapping section 120 includes a pair of magnetic pole pieces, the two magnetic pole pieces included in the magnetic pole piece pair are spaced apart from each other by a predetermined distance of, for example, not less than 100 μm and not more than 500 μm. The cell 200 is disposed in the space between the two magnetic pole pieces. The magnetic pole pieces may, for example, be magnetized iron pieces. The iron pieces may, for example, be magnetized by a permanent magnet, an electromagnet, a magnetic circuit, or a superconducting magnet.

In the case where the particle trapping section 120 includes a pair of magnetic pole pieces, the value of B(dB/dx) may be adjusted by selecting the material for the magnetic pole pieces so as to establish the relationship indicated by Expression (3). Alternatively, the value of B(dB/dx) may be adjusted by adjusting the magnetic force of the magnetic pole pieces, or the distance between the two magnetic pole pieces. In the case where the magnetic pole pieces are magnetized using an electromagnet, a magnetic circuit, or a superconducting magnet, the magnetic force of the magnetic pole pieces can be adjusted by adjusting the current value of a current supplied thereto. Alternatively, in the case where the magnetic pole pieces are magnetized using a permanent magnet, the magnetic force of the magnetic pole pieces can be adjusted by selecting the permanent magnet used.

In addition, in the case where the particle trapping section 120 includes an electromagnet, a magnetic circuit, or a superconducting magnet, the value of B(dB/dx) may be adjusted by adjusting the current value of a current supplied thereto so as to establish the relationship indicated by Expression (3).

In addition, although in this embodiment, the particle p having the second crystal form is trapped using a magnetic field, the particle p having the first crystal form may be trapped using a magnetic field by adjusting the volume magnetic susceptibility difference ($\chi p - \chi m$) between the particle p and the solvent m or the value of B(dB/dx). Thus, according to this embodiment, the particle p (crystal form) that is to be trapped by the particle trapping section 120 (magnetic field) is selectable.

Third Embodiment

A third embodiment of the present invention will now be described with reference to FIG. 11. Note that matter similar to that described above in the second embodiment will not be redundantly described. The third embodiment is different from the second embodiment in that a particle separating device 100 includes a plurality of particle trapping sections 120.

Figure 11:
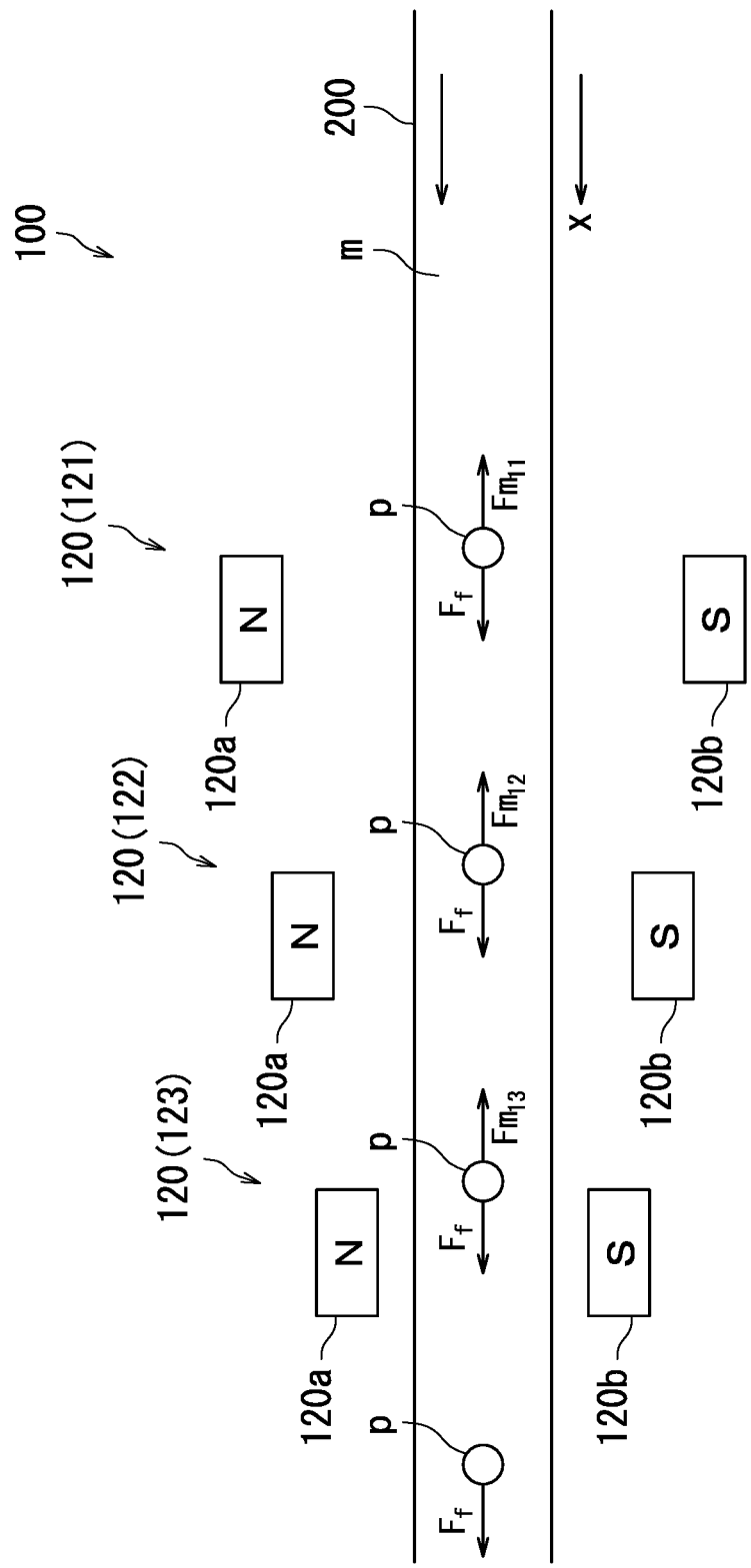
FIG. 11 is a diagram showing a configuration of a particle separating device according to a third embodiment of the present invention.

FIG. 11 is a diagram showing a configuration of a particle separating device 100 of this embodiment. As shown in FIG. 11, the particle separating device 100 includes three particle trapping sections 120. The particle trapping sections 120 of this embodiment are arranged in a row extending in the direction (x-direction) in which the solvent m flows, and are also hereinafter referred to as a "first particle trapping section 121," a "second particle trapping section 122," and a "third particle trapping section 123" in sequence in the direction in which the solvent m flows.

The three particle trapping sections 120 generate respective magnetic fields each having a different value of B(dB/dx), which is the value of the product of the magnetic flux density B and the gradient of the magnetic flux density (magnetic field gradient) dB/dx. Specifically, the value of B(dB/dx) increases in sequence in the direction in which the solvent m flows. As a result, in the case where the volume magnetic susceptibility difference ($\chi p-\chi m$) between the particle p and the solvent m is constant, the magnetic force Fm applied to the particles p increases in sequence in the direction in which the solvent m flows. Note that as described above in the second embodiment, the magnetic force Fm acts in such a direction that the particles p is pushed back against the flow of the solvent m.

B(dB/dx) in a magnetic field generated by the first particle trapping section 121 is also hereinafter referred to as "B(dB/dx)$_1$." Similarly, B(dB/dx) in a magnetic field generated by the second particle trapping section 122 is also hereinafter referred to as "B(dB/dx)$_2$," and B(dB/dx) in a magnetic field generated by the third particle trapping section 123 is also hereinafter referred to as "B(dB/dx)$_3$." In addition, a magnetic force Fm caused by the magnetic field generated by the first particle trapping section 121 is also referred to as a "magnetic force Fm$_{11}$." Similarly, a magnetic force Fm caused by the magnetic field generated by the second particle trapping section 122 is also referred to as a "magnetic force Fm$_{12}$," and a magnetic force Fm caused by the magnetic field generated by the third particle trapping section 123 is also referred to as a "magnetic force Fm$_{13}$."

In this embodiment, a relationship represented by Expression (4) below is established between B(dB/dx)$_1$, B(dB/dx)$_2$, and B(dB/dx)$_3$.

$$B(dB/dx)_3 > B(dB/dx)_2 > B(dB/dx)_1 \quad (4)$$

In this embodiment, the distance between the two permanent magnets 120a and 120b in each of the three particle trapping sections 120 is adjusted so as to establish the relationship represented by Expression (4). Therefore, the three particle trapping sections 120 have different distances between the two permanent magnets 120a and 120b. Specifically, the distance between the two permanent magnets 120a and 120b decreases in sequence in the direction in which the solvent m flows.

Next, motion of the particles p (crystal particles) will be described with reference to FIG. 11. The particles p have a plurality of crystal forms. Therefore, as described above in the first embodiment, the particles p have different volume magnetic susceptibilities for the different crystal forms.

Each of the particles p that are introduced together with the solvent m into the cell 200 firstly reaches near the magnetic field formed by the first particle trapping section 121, and receives the magnetic force Fm$_{11}$. The magnetic force Fm$_{11}$ can be represented by Expression (5) below.

$$Fm_{11} = -\{4(\chi p - \chi m)\pi r^3/3\mu_o\}B(dB/dx)_1 \quad (5)$$

As indicated in Expression (5), the magnetic force Fm$_{11}$ has a magnitude depending on the volume magnetic susceptibility $\chi p$ of the particle p. In other words, the magnetic force Fm$_{11}$ has a magnitude depending on the crystal form of the particle p. Therefore, it is determined whether or not the first particle trapping section 121 traps the particle p, depending on the crystal form of the particle p. Specifically, in the case where the magnetic force Fm$_{11}$ is greater than or equal to the fluid driving force F$_f$, the movement of the particle p is blocked by the magnetic force Fm$_{11}$, so that the particle p is trapped by the magnetic field. Meanwhile, in the case where the magnetic force Fm$_{11}$ is smaller than the fluid driving force F$_f$, the particle p passes through the magnetic field formed by the first particle trapping section 121.

The particle p that has passed through the magnetic field formed by the first particle trapping section 121 next reaches near the magnetic field formed by the second particle trapping section 122, and receives the magnetic force Fm$_{12}$. The magnetic force Fm$_{12}$ can be represented by Expression (6) below. Note that the relationship between the magnetic force Fm$_{11}$ and the magnetic force Fm$_{12}$ is represented by Expression (7) below.

$$Fm_{12} = -\{4(\chi p - \chi m)\pi r^3/3\mu_o\}B(dB/dx)_2 \quad (6)$$

$$Fm_{12} > Fm_{11} \quad (7)$$

As with the magnetic force Fm$_{11}$, the magnetic force Fm$_{12}$ has a magnitude depending on the crystal form of the particle p. Therefore, it is determined whether or not the second particle trapping section 122 traps the particle p, depending on the crystal form of the particle p. Specifically, in the case where the magnetic force Fm$_{12}$ is greater than or equal to the fluid driving force F$_f$, the particle p is trapped by the magnetic field. Meanwhile, in the case where the magnetic force Fm$_{12}$ is smaller than the fluid driving force F$_f$, the particle p passes through the magnetic field formed by the second particle trapping section 122.

The particle p that has passed through the magnetic field formed by the second particle trapping section 122 next reaches near the magnetic field formed by the third particle trapping section 123, and receives the magnetic force Fm$_{13}$. The magnetic force Fm$_{13}$ can be represented by Expression (8) below. Note that the relationship between the magnetic force Fm$_{12}$ and the magnetic force Fm$_{13}$ is represented by Expression (9) below.

$$Fm_{13} = -\{4(\chi p - \chi m)\pi r^3/3\mu_o\}B(dB/dx)_3 \quad (8)$$

$$Fm_{13} > Fm_{12} \quad (9)$$

As with the magnetic force Fm$_{11}$ and the magnetic force Fm$_{12}$, the magnetic force Fm$_{13}$ has a magnitude depending on the crystal form of the particle p. Therefore, it is determined whether or not the third particle trapping section 123 traps the particle p, depending on the crystal form of the particle p. Specifically, in the case where the magnetic force Fm$_{13}$ is greater than or equal to the fluid driving force F$_f$, the particle p is trapped by the magnetic field. Meanwhile, in the case where the magnetic force $Fm_{13}$ is smaller than the fluid driving force $F_f$, the particle p passes through the magnetic field formed by the third particle trapping section 123.

In the foregoing, the third embodiment has been described. According to this embodiment, the particles p can be separated according to crystal form. In addition, according to this embodiment, even in the case where the particles p have three or four crystal forms, the particles p can be separated according to crystal form by adjusting the values of $B(dB/dx)_1$, $B(dB/dx)_2$, and $B(dB/dx)_3$. The values of $B(dB/dx)_1$, $B(dB/dx)_2$, and $B(dB/dx)_3$ are adjusted by referring to the volume magnetic susceptibility of the particles p for each crystal form. The volume magnetic susceptibility of the particles p for each crystal form may be acquired by referring to the reference data 43 described above in the first embodiment.

Although in this embodiment, the values of $B(dB/dx)_1$, $B(dB/dx)_2$, and $B(dB/dx)_3$ are adjusted by adjusting the distance between the two permanent magnets 120a and 120b of each of the three particle trapping sections 120, the values of $B(dB/dx)_1$, $B(dB/dx)_2$, and $B(dB/dx)_3$ may be adjusted by selecting the permanent magnets 120a and 120b used.

In addition, although in this embodiment, each particle trapping section 120 includes the pair of permanent magnets 120a and 120b, each particle trapping section 120 may include a pair of magnetic pole pieces for generating a magnetic field gradient (a gradient of a magnetic flux density). Alternatively, each particle trapping section 120 may include an electromagnet, a magnetic circuit, or a superconducting magnet for generating a magnetic field gradient. In the case where each particle trapping section 120 includes a pair of magnetic pole pieces, the cell 200 is disposed to be interposed between the two magnetic pole pieces of each particle trapping section 120.

In the case where each particle trapping section 120 includes a pair of magnetic pole pieces, the values of $B(dB/dx)_1$, $B(dB/dx)_2$, and $B(dB/dx)_3$ may be adjusted by selecting the material for the magnetic pole pieces. Alternatively, the values of $B(dB/dx)_1$, $B(dB/dx)_2$, and $B(dB/dx)_3$ may be adjusted by adjusting the magnetic force of the magnetic pole pieces, or the distance between the two magnetic pole pieces.

In addition, in the case where each particle trapping section 120 includes an electromagnet, a magnetic circuit, or a superconducting magnet, the values of $B(dB/dx)_1$, $B(dB/dx)_2$, and $B(dB/dx)_3$ may be adjusted by adjusting the current value of a current supplied thereto.

In addition, although in this embodiment, the particle separating device 100 includes the three particle trapping sections 120, the particle separating device 100 may include two or four or more particle trapping sections 120.

In the foregoing, embodiments of the present invention have been described with reference to the drawings. Note that the present invention is not limited to the above embodiments, and can be embodied in various forms without departing the scope and spirit of the present invention.

For example, although in the third embodiment, the volume magnetic susceptibility of the solvent m is constant, the present invention is not limited to this. In addition to the adjustment of the value of B(dB/dx) of each of the particle trapping sections 120, the volume magnetic susceptibility difference ($\chi p - \chi m$) between the particle p and the solvent m may be adjusted as described above in the second embodiment.

INDUSTRIAL APPLICABILITY

With the particle analyzing apparatus and the particle analysis method of the present invention, the crystal form of a particle can be determined. In addition, with the particle separating device and the particle separating method of the present invention, particles can be separated according to crystal form. The present invention is useful in fields in which particles having a plurality of crystal forms are dealt with, such as the medical product field.

REFERENCE SIGNS LIST

10 Particle analyzing apparatus
20 Magnetic field generating section
30 Detection section
32 Magnification section
34 Imaging section
40 Calculation section
41 Storage
42 Processor
43 Reference data
50 Light source
100 Particle separating device
120 Particle trapping section
$F_f$ Fluid driving force
Fm Magnetic force
p Particle

The invention claimed is:

1. A particle analyzing apparatus comprising:
   a processor configured to acquire a volume magnetic susceptibility of an analyte particle in a solid phase; and
   storage configured to store reference data indicating a volume magnetic susceptibility of a reference particle of the same type as a type of the analyte particle for each of crystal forms of the analyte particle, the reference particle being in a solid phase,
   wherein
   the processor determines a crystal form from among the crystal forms of the analyte particle on the basis of the volume magnetic susceptibility of the analyte particle and the reference data.

2. The particle analyzing apparatus according to claim 1, wherein
   the reference data indicates a relationship between a particle diameter and the volume magnetic susceptibility of the reference particle for each of the crystal forms of the analyte particle, and
   the processor acquires a particle diameter and the volume magnetic susceptibility of the analyte particle, and determines the crystal form of the analyte particle from among the crystal forms on the basis of the particle diameter and the volume magnetic susceptibility of the analyte particle and the reference data.

3. A particle separating device for separating particles according to crystal forms of the particles, comprising:
   a particle trapping section that includes paired permanent magnets between which a tubular member is disposed and that is configured to generate a gradient of a magnetic flux density using the paired permanent magnets, and apply a magnetic force to the particles in a direction opposite to a direction in which a liquid medium containing the particles flows, the liquid medium flowing in the tubular member,
   wherein
   the particle trapping section stops a particle of the particles having a particular crystal form among the crystal forms in the liquid medium using the magnetic force.

4. The particle separating device according to claim 3, wherein
   there are a plurality of the particle trapping sections, the plurality of particle trapping sections are arranged in a row extending in the direction in which the liquid medium flows, and the plurality of particle trapping sections generate magnetic fields each having a different value of a product of the magnetic flux density and the gradient of the magnetic flux density.

5. A particle analysis method comprising:

acquiring a volume magnetic susceptibility of an analyte particle, the analyte particle being in a solid phase; and determining a crystal form of the analyte particle from among crystal forms on the basis of the volume magnetic susceptibility of the analyte particle and reference data, the reference data indicating a volume magnetic susceptibility of a reference particle of the same type as a type of the analyte particle for each of the crystal forms of the analyte particle, the reference particles being in a solid phase.

6. The particle analysis method according to claim 5, further comprising:

acquiring a particle diameter of the analyte particle, wherein the reference data indicates a relationship between a particle diameter and the volume magnetic susceptibility of the reference particle for each of the crystal forms of the analyte particle, and in the determining the crystal form of the analyte particle from among the crystal forms, the crystal form of the analyte particle is determined on the basis of the particle diameter and the volume magnetic susceptibility of the analyte particle and the reference data.

7. A particle separating method for separating particles according to crystal forms of the particles, comprising:

applying a magnetic force to the particles in a direction opposite to a direction in which a liquid medium containing the particles flows by generating a gradient of a magnetic flux density using paired permanent magnets between which a tubular member is disposed, the liquid medium flow in the tubular member, wherein in the applying a magnetic force to the particles, a particle having a particular crystal form among the crystal forms of the particles is stopped in the liquid medium using the magnetic force.

8. The particle separating method according to claim 7, further comprising:

preparing the liquid medium having a volume magnetic susceptibility that allows the particle having the particular crystal form to be stopped in the liquid medium.

* * * * *